United States Patent
Ide et al.

(10) Patent No.: US 11,577,607 B2
(45) Date of Patent: Feb. 14, 2023

(54) OPERATION DEVICE OF AUTOMATIC DRIVING VEHICLE

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 16/908,828

(22) Filed: Jun. 23, 2020

(65) Prior Publication Data

US 2020/0406751 A1    Dec. 31, 2020

(30) Foreign Application Priority Data

Jun. 28, 2019 (JP) .............................. JP2019-121402

(51) Int. Cl.
    *B60K 35/00*    (2006.01)
    *A61G 3/06*     (2006.01)
    *G06F 3/0488*   (2022.01)
    *G05D 1/00*     (2006.01)

(52) U.S. Cl.
    CPC .............. *B60K 35/00* (2013.01); *A61G 3/061* (2013.01); *G06F 3/0488* (2013.01); *G05D 1/0088* (2013.01); *G05D 2201/0213* (2013.01)

(58) Field of Classification Search
    CPC ....... B60K 35/00; A61G 3/061; G06F 3/0488; G05D 1/0088; G05D 2201/0213
    See application file for complete search history.

(56) References Cited

U.S. PATENT DOCUMENTS

| | | | |
|---|---|---|---|
| 2002/0161501 A1* | 10/2002 | Dulin ................. | B60H 1/00742 701/45 |
| 2014/0219756 A1* | 8/2014 | Smith .................... | A61G 3/065 414/812 |
| 2017/0151958 A1 | 6/2017 | Sakuma | |
| 2018/0373343 A1* | 12/2018 | Hashimoto ........... | B60K 37/06 |

FOREIGN PATENT DOCUMENTS

| | | |
|---|---|---|
| JP | H05-38005 A | 2/1993 |
| JP | 2002-347607 A | 12/2002 |
| JP | 2010-254010 A | 11/2010 |
| JP | 2018-086992 A | 6/2018 |
| JP | 2018-144511 A | 9/2018 |
| JP | 2018-180582 A | 11/2018 |
| WO | 2015/141308 A1 | 9/2015 |

OTHER PUBLICATIONS

"Growing Use of Touch Panels in FA Control;" https://nasueidensha.com/touch-panel/; May 14, 2015.

* cited by examiner

*Primary Examiner* — Vivek D Koppikar
*Assistant Examiner* — Jeffrey R Chalhoub
(74) *Attorney, Agent, or Firm* — Oliff PLC (57) ABSTRACT

An automatic driving vehicle includes a touch panel that displays various buttons. An operator can input a drive control instruction in relation to the automatic driving vehicle, with the buttons displayed on the touch panel. In addition to the touch panel, the automatic driving vehicle includes a mechanical door switch for opening and closing an automatic door and a mechanical ramp switch for extending and retracting an automatic ramp, both being disposed spaced apart from the touch panel.

12 Claims, 7 Drawing Sheets

OPERATION DEVICE OF AUTOMATIC DRIVING VEHICLE

CROSS REFERENCE TO RELATED APPLICATION

This application claims priority to Japanese Patent Application No. 2019-121402 filed on Jun. 28, 2019, which is incorporated herein by reference in its entirety including the specification, claims, drawings, and abstract.

TECHNICAL FIELD

This specification discloses an operation device of an automatic driving vehicle.

BACKGROUND

Conventionally, automatic driving vehicles adapted to automatic driving have been known. Automatic driving means that drive control including, for example, vehicle speed control or steering control is at least partially executed by a computer.

Conventionally, some automatic driving vehicles include a touch panel for giving a drive control instruction in relation to the automatic driving vehicle. For example, International Laid-Open Publication 2015/141308 discloses an automatic driving vehicle that includes a touch panel that enables designation of a running direction (going straight or turning right or left) of the automatic driving vehicle.

Here, an automatic driving vehicle may be used as a bus-type vehicle in which an operator who operates the automatic driving vehicle and many unspecified occupants ride. In such a case, the operator executes an opening/closing operation of an automatic door for occupants to get on or off the vehicle, or an extension/retraction operation of an automatic ramp (for example, a ramp for use by an occupant in a wheelchair to get on or off the vehicle) provided to the automatic driving vehicle.

In the case where a touch panel is provided to the automatic driving vehicle, an opening/closing instruction in relation to the automatic door or an extension/retraction instruction in relation to the automatic ramp can be inputted via the touch panel. Specifically, a door button via which to input an opening/closing instruction in relation to the automatic door or a ramp button via which to input an extension/retraction instruction in relation to the automatic ramp is displayed on the touch panel, so that the operator can operate these buttons to open/close the automatic door or to extend/retract the automatic ramp.

In general, however, the touch panel already displays a plurality of buttons for inputting various drive control instructions in relation to the automatic driving vehicle. If the door button or the ramp button is displayed on the touch panel, the operator may possibly operate the door button or the ramp button erroneously. As erroneous operation as to the opening/closing operation of the automatic door or the extension/retraction operation of the automatic ramp may threaten the safety of occupants in particular, such an erroneous operation in particular needs to be avoided.

An erroneous operation in opening/closing of the automatic door or extension/retraction of the automatic ramp includes, for example, an erroneous operation of opening/closing the automatic door or an erroneous operation of extending/retracting the automatic ramp by the operator when intending to input a drive control instruction to the automatic driving vehicle, and an erroneous input of a drive control instruction to the automatic driving vehicle by the operator when intending to open/close the automatic door or to extend/retract the automatic ramp.

An object of an operation device of an automatic driving vehicle disclosed in this specification is to prevent erroneous operation by an operator as to opening/closing of an automatic door or extension/retraction of an automatic ramp of an automatic driving vehicle having a touch panel that enables input of a drive control instruction to the automatic driving vehicle.

SUMMARY

According to a first aspect disclosed in this specification, there is provided an operation device of an automatic driving vehicle of bus type, the automatic driving vehicle being capable of automatic driving and to be ridden by many unspecified occupants, the operation device including: a touch panel for enabling input of a drive control instruction and input of a control instruction in relation to a vehicle-mounted instrument, and for displaying a button for inputting the drive control instruction in relation to the automatic driving vehicle; and a door switch disposed at a position spaced apart from the touch panel, the door switch being for opening and closing an automatic door.

According to the above-described structure, the door switch is provided in addition to the touch panel at a position spaced apart from the touch panel. With this disposition, since the door switch is spaced apart from the touch panel, an operator intending to operate the touch panel to input a drive control instruction can be prevented from erroneously operating the door switch and thereby executing an opening/closing operation of the automatic door. In addition, since the touch panel is spaced apart from the door switch, the operator intending to operate the door switch to execute an opening/closing operation of the automatic door can be prevented from erroneously operating the touch panel and thereby executing drive control in relation to the automatic driving vehicle.

The operation device may further includes an operator seat for the operator who operates the touch panel and the door switch, and the door switch is disposed near the automatic door or in the direction toward the automatic door when viewed from the operator seat.

The automatic door may be provided only on one side surface of the automatic driving vehicle, the operation device further includes the operator seat for the operator who operates the touch panel and the door switch, the operator seat being provided behind the touch panel, and the door switch is provided at a position that is closer to the automatic door than is the touch panel The operation device may further includes the operator seat for the operator who operates the touch panel and the door switch, the operator seat being disposed along a wall surface on the side with the automatic door and provided behind the touch panel, and the door switch is disposed closer to the operator seat than is the automatic door and to the side of the operator seat.

The door switch may be not displayed on the touch panel.

The operation device may further includes a ramp switch for extending and retracting an automatic ramp that is stored in a storage unit provided below the floor of the automatic driving vehicle, the automatic ramp being projectable to the lateral side of the automatic driving device through an opening of the storage unit, and the door switch and the ramp switch are provided close to each other on a wall surface in the cabin of the automatic driving vehicle.

According to another aspect disclosed in this specification, there is provided an operation device of an automatic driving vehicle of bus type, the automatic driving vehicle being capable of automatic driving and to be ridden by many unspecified occupants, the operation device including: a touch panel for enabling input of a drive control instruction and input of a control instruction in relation to a vehicle-mounted instrument, and for displaying a button for inputting the drive control instruction in relation to the automatic driving vehicle; and a ramp switch for extending and retracting an automatic ramp that is stored in a storage unit provided below the floor of the automatic driving vehicle, the automatic ramp being projectable to the lateral side of the automatic driving device through the opening of the storage unit, the ramp switch being provided at a position spaced apart from the touch panel.

According to the above-described structure, the ramp switch is provided in addition to the touch panel at a position spaced apart from the touch panel. With this disposition, an operator intending to operate the touch panel to input a drive control instruction can be prevented from erroneously operating the ramp switch spaced apart from the touch panel, and thereby extending/retracting the automatic ramp. In addition, the operator intending to operate the ramp switch to extend/retract the automatic ramp can be prevented from erroneously operating the touch panel spaced apart from the ramp switch, and thereby executing drive control in relation to the automatic driving vehicle.

The operation device may further includes an operator seat for the operator who operates the touch panel and the ramp switch, and the ramp switch is disposed near the opening of the storage unit or in the direction of the opening of the storage unit when viewed from the operator seat.

The automatic ramp may be provided only on one side surface of the automatic driving vehicle, the operation device further includes the operator seat for the operator who operates the touch panel and the ramp switch, the operator seat being provided behind the touch panel, and the ramp switch is provided at a position that is closer to the automatic ramp than is the touch panel.

The operation device may further includes the operator seat for the operator who operates the touch panel and the ramp switch, the operator seat being disposed along a wall surface on the side with the automatic ramp and provided behind the touch panel, and the ramp switch is disposed closer to the operator seat than is the automatic ramp and to the side of the operator seat.

The ramp switch may be not displayed on the touch panel.

The operation device may further includes a door switch for opening and closing an automatic door, and the ramp switch and the door switch are provided close to each other on a wall surface in the cabin of the automatic driving vehicle.

The operation device of the automatic driving vehicle disclosed in this specification makes it possible to prevent erroneous operation by the operator as to closing or opening of the automatic door or extension or retraction of the automatic ramp of the automatic driving vehicle having the touch panel that enables input of a drive control instruction in relation to the automatic driving vehicle.

BRIEF DESCRIPTION OF DRAWINGS

Embodiment(s) of the present disclosure will be described based on the following figures, wherein.

DESCRIPTION OF EMBODIMENTS

Figure 1:
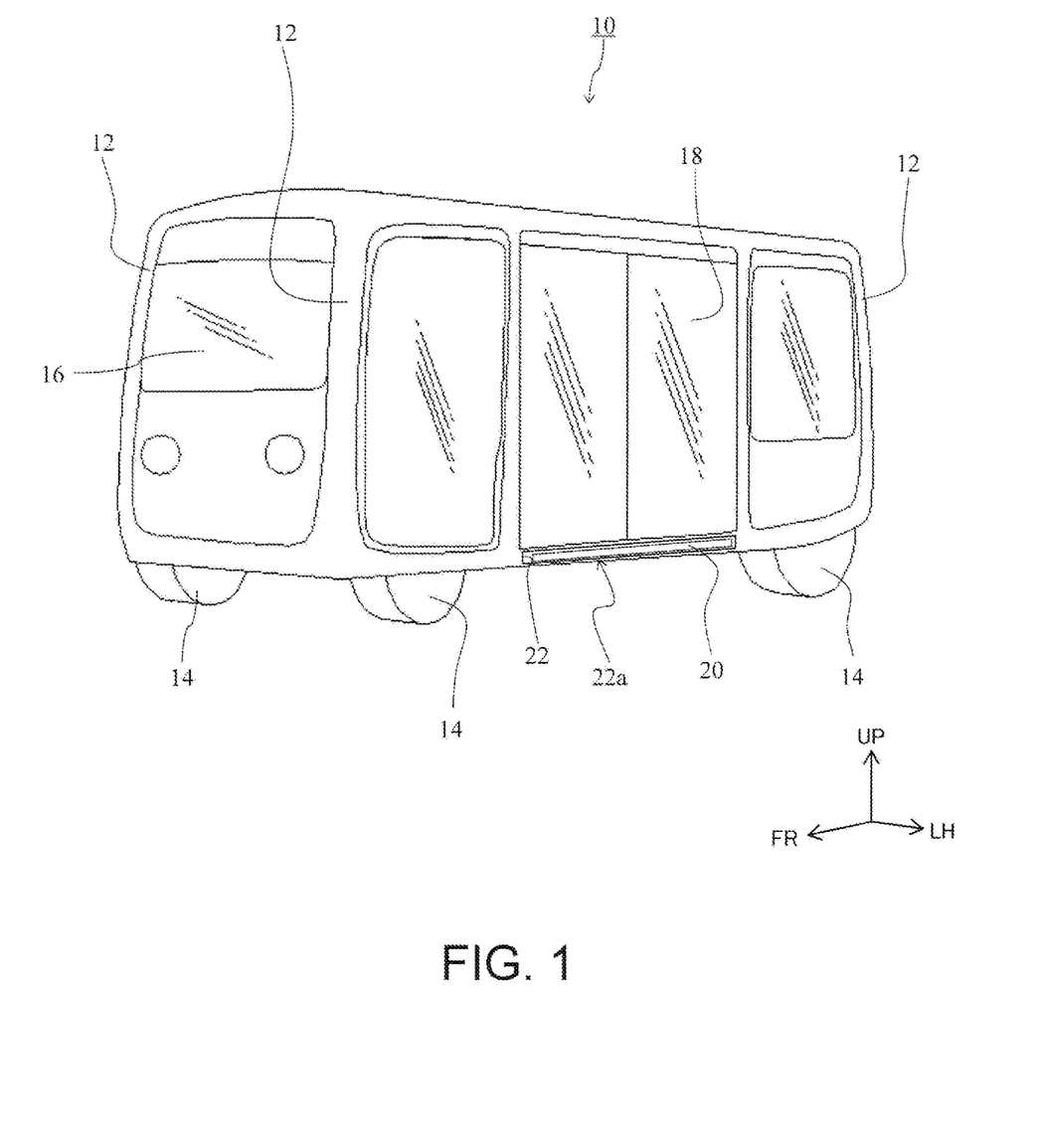
FIG. 1 is a diagram illustrating the external appearance of an automatic driving vehicle according to an embodiment.

FIG. 1 illustrates the external appearance of an automatic driving vehicle 10 according to this embodiment. In the respective drawings in this specification, terms "front (FR)" and "rear" mean front and rear in the front-rear direction of the vehicle; terms "left (LH)" and "right" mean left and right when facing forward; and terms "up (UP)" and "down" mean up and down in the up-down direction of the vehicle.

The automatic driving vehicle 10 is shaped like a substantial rectangular parallelepiped that is front-rear symmetrical, whose external design as well is front-rear symmetrical. The automatic driving vehicle 10 has pillars 12 disposed at respective four corners in a plan view and extending in the up-down direction. Below each pillar 12, a wheel 14 is mounted. A large part of each of the front, rear, right, and left side walls of the automatic driving vehicle 10 is made from transparent or semi-transparent panels 16. The panel 16 may be a display panel, where letters or the like may be displayed.

Some panels 16 on the left side wall constitute a slidable automatic door 18. The automatic door 18 slidably opens so that an occupant can get on or off the vehicle. The automatic door 18 slides (that is, is opened or closed) with a driving force of a door motor. The automatic door 18 is opened or closed by means of an operation by an operator in the automatic driving vehicle 10, as to be described later.

Figure 2:
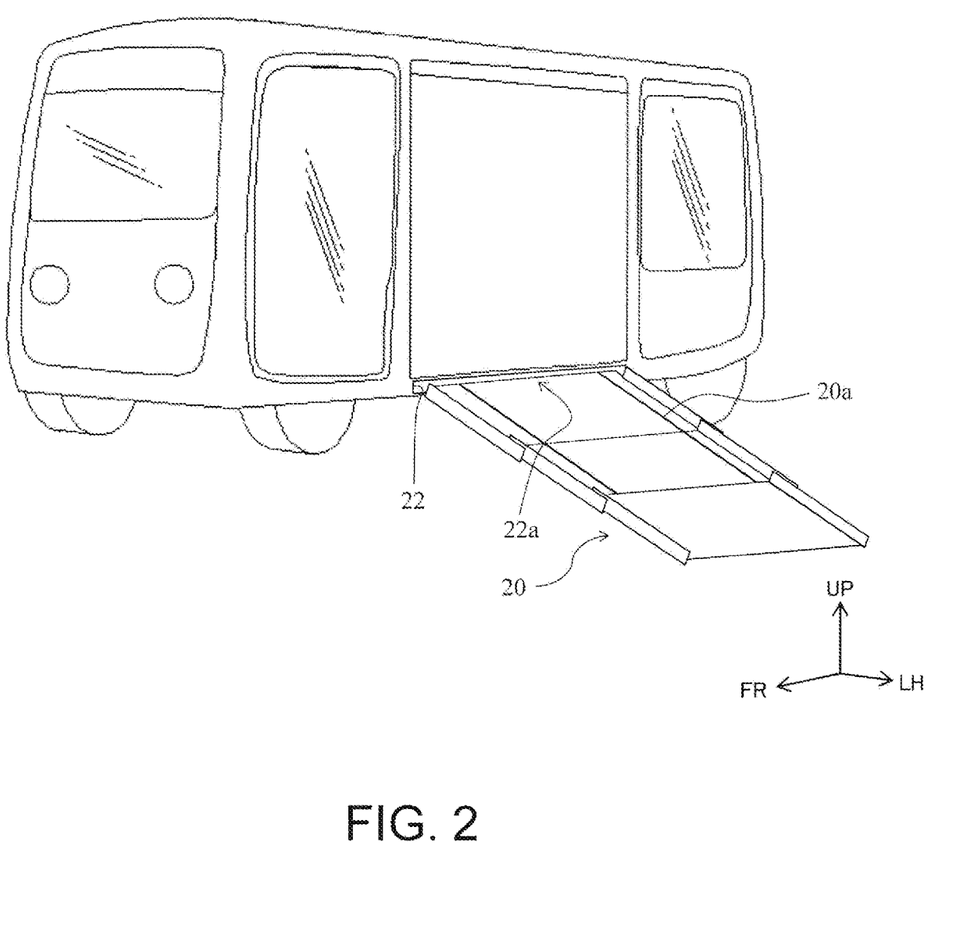
FIG. 2 is a diagram illustrating the external appearance with an automatic ramp extending.

Below the floor of the automatic driving vehicle 10, a storage unit 22 for storing an automatic ramp 20 is provided. The automatic ramp 20 is to project through an opening 22a of the storage unit 22 to the lateral side (the left side in this embodiment) of the automatic driving vehicle 10 to thereby constitute a ramp connecting the floor of the cabin of the automatic driving vehicle 10 and a road or ground outside the vehicle. FIG. 2 illustrates the automatic ramp 20 projecting. As illustrated in FIG. 2, the opening 22a of the storage unit 22 is provided below the automatic door 18 in this embodiment. The automatic ramp 20 is used, for example, for an occupant of a wheelchair to get on or off the vehicle.

The automatic ramp 20 is extended or retracted with a driving force of a ramp motor. Specifically, the automatic ramp 20 includes a plurality of plates, which are sequentially fed out through the opening 22a of the storage unit 22 with a driving force of the ramp motor, whereby the automatic ramp 20 projects to the lateral side of the automatic driving vehicle 10 (the state illustrated in FIG. 2). The automatic ramp 20 includes a wire 20a, and the wire 20a is reeled up toward the storage unit 22 with a driving force of the ramp motor, so that the automatic ramp 20 is stored in the storage unit 22 (the state illustrated in FIG. 1). Similar to the automatic door 18, the automatic ramp 20 as well is extended or retracted by means of an operation by an operator. In this embodiment, the automatic door 18 and the automatic ramp 20 are provided only on one side surface of the automatic driving vehicle 10.

The automatic driving vehicle 10 is a vehicle adapted to automatic driving. Specifically, the automatic driving vehicle 10 can be driven in a plurality of driving modes, including an automatic driving mode, a semiautomatic driving mode, and a manual driving mode.

An automatic driving mode is a driving mode in which a majority of drive control is executed by a computer mounted in the automatic driving vehicle 10. In this specification, drive control is a concept encompassing gear shift control, vehicle speed control, and steering control. Vehicle speed control is a concept including launch control, stop control, and acceleration/deceleration control of the automatic driving vehicle 10. The automatic driving vehicle 10 can communicate with a management center that manages and controls a plurality of automatic driving vehicles 10. In the automatic driving mode, the automatic driving vehicle 10 runs along a route determined in advance under control by the management center. In the automatic driving mode, although drive control is executed by a computer, following a driving instruction from the management center, launch control for launching the vehicle from a stopped state is executed by means of an operation by the operator in the automatic driving vehicle 10.

Similar to the automatic driving mode, a semiautomatic driving mode is a driving mode in which a majority of drive control of the automatic driving vehicle 10 is executed by a computer mounted in the automatic driving vehicle 10. In the semiautomatic driving mode, the computer executes drive control based on the results of detection by various sensors (for example, a camera or a lidar) mounted in the automatic driving vehicle 10, rather than based on instructions from the management center, such that the vehicle runs along a predetermined route. In the semiautomatic driving mode as well, launch control for launching the vehicle from the stopped state is executed by means of an operation by the operator in the automatic driving vehicle 10.

A manual driving mode is a mode in which automatic driving of the automatic driving vehicle 10 is not executed, and the operator in the automatic driving vehicle 10 executes drive control of the automatic driving vehicle 10.

The automatic driving vehicle 10 is a bus in which many unspecified occupants ride. In this embodiment, the automatic driving vehicle 10 is utilized as a bus that runs along a predetermined route within a specified site to transport passengers. Thus, the automatic driving vehicle 10 is expected to repeat stop and launch at a relatively high frequency. In addition, the automatic driving vehicle 10 is expected to run at a relatively slow speed (for example, slower than 30 km/h).

Formation of use of the automatic driving vehicle 10 disclosed in this specification, however, is arbitrarily changeable. That is, the automatic driving vehicle 10 can be utilized, for example, as a mobile business space, a sales outlet that displays and sells various products, or an eating outlet that serves cooked foods and drinks. Alternatively, as another configuration, the automatic driving vehicle 10 can be used as an office where people do office work or have meetings with clients. Occasions where the automatic driving vehicle 10 is utilized are not limited to business scenes, but the automatic driving vehicle 10 may be used, for example, as transportation means in private use. In addition, the running pattern and running speed of the automatic driving vehicle 10 can be arbitrarily changed.

The automatic driving vehicle 10 is an electric vehicle including a drive motor as a motor that receives electric power from a battery. The battery is a chargeable and dischargeable secondary battery, and is regularly charged with power from an outside source. The automatic driving vehicle 10, however, is not limited to an electric vehicle, and may be a vehicle of any other type. For example, the automatic driving vehicle 10 may be an engine vehicle having an engine as a motor, or a hybrid vehicle having an engine and a drive motor as a motor. Alternatively, the automatic driving vehicle 10 may be a hydrogen vehicle that drives a drive motor with electric power generated by a fuel cell.

Figure 3:
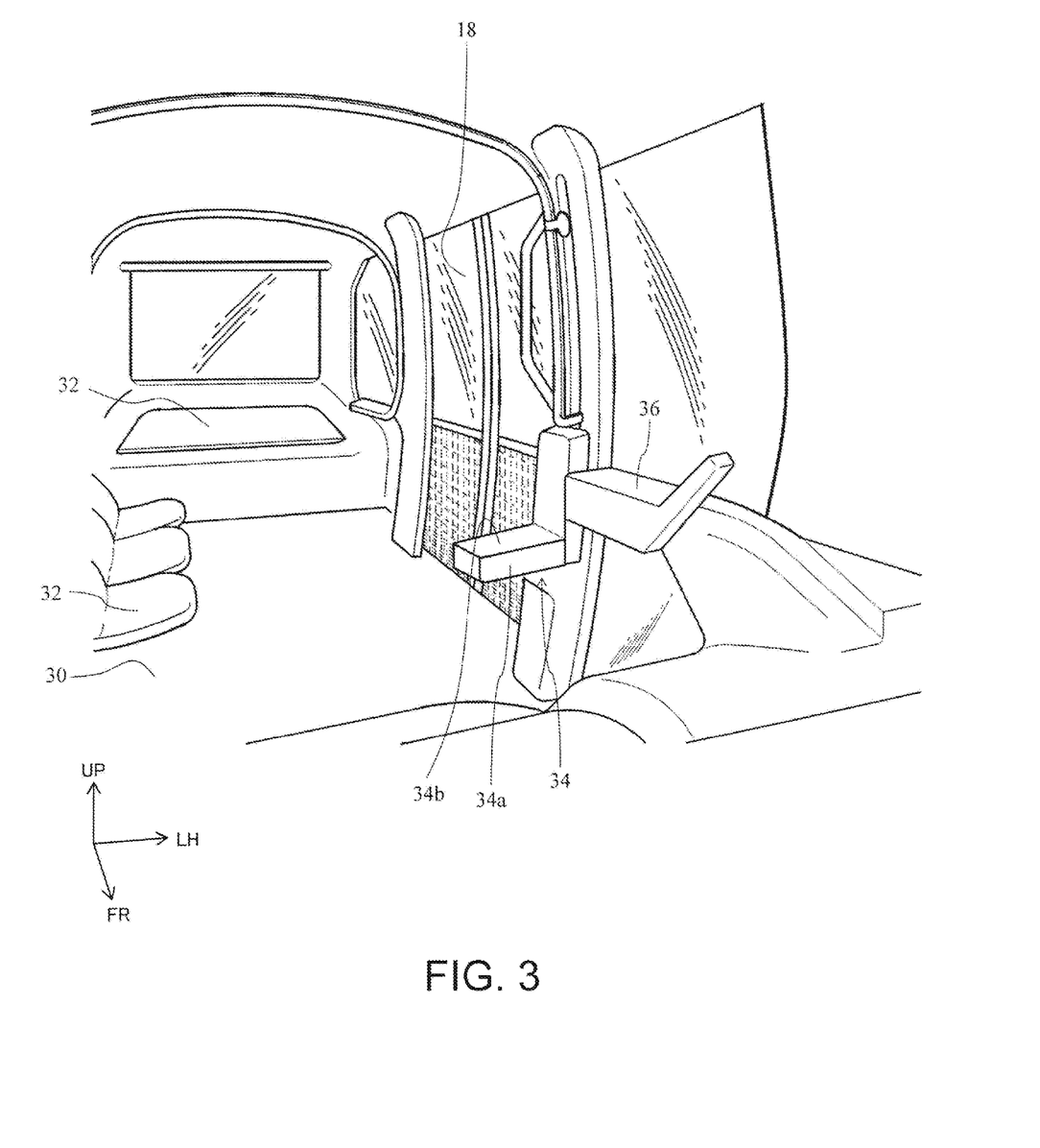
FIG. 3 is a first perspective view of the interior of the cabin of the automatic driving vehicle according to the embodiment.
Figure 4:
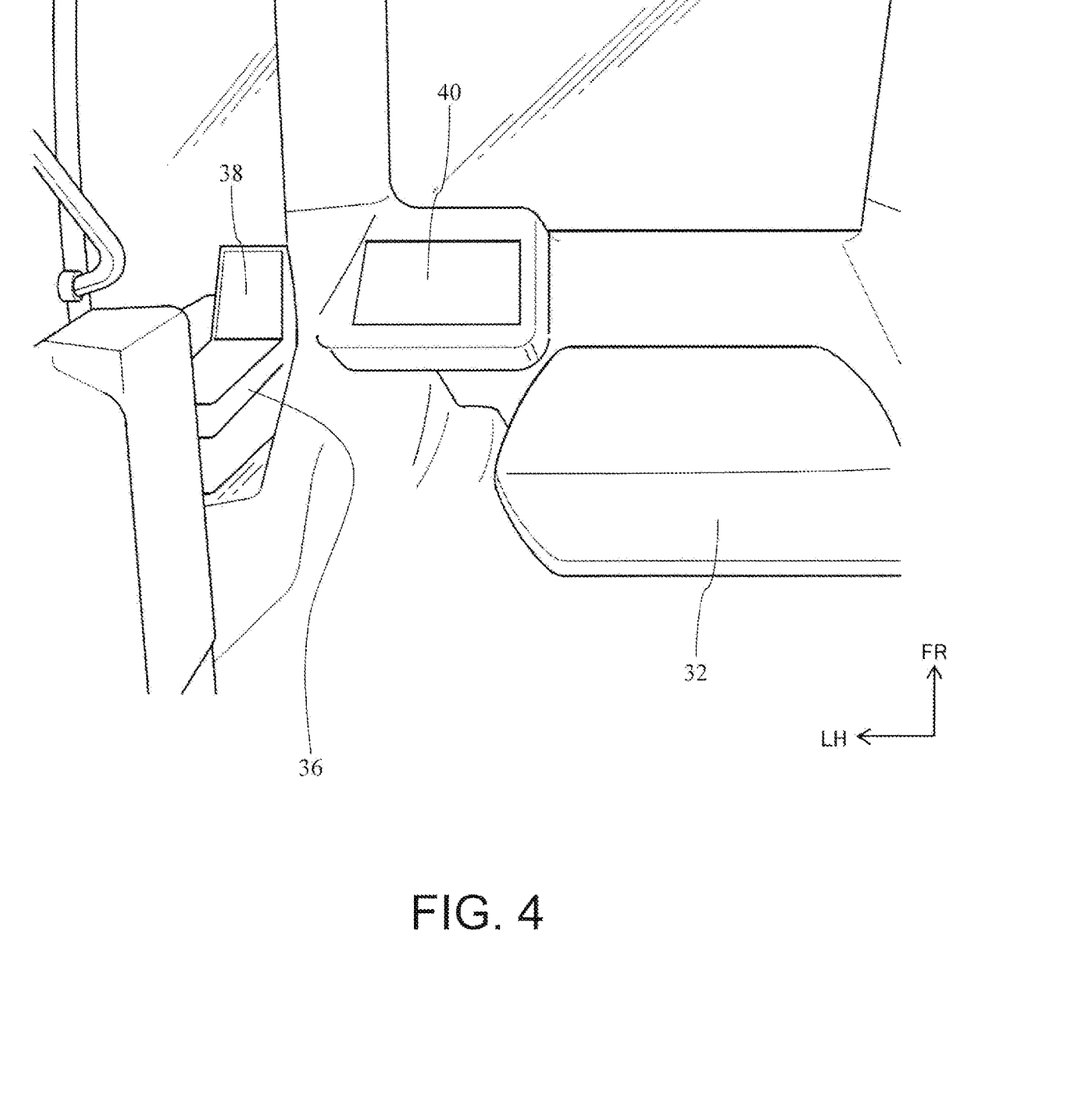
FIG. 4 is a second perspective view of the interior of the cabin of the automatic driving vehicle according to the embodiment.

FIG. 3 and FIG. 4 are perspective views of the interior of the cabin of the automatic driving vehicle 10. As the automatic driving vehicle 10 is used as a bus, as described above, an area in the middle of the cabin forms a floor 30 where occupants stand or where a wheelchair with an occupant sitting therein is placed. Along the side wall in the cabin, seats 32 for occupants are provided.

The automatic driving vehicle 10 includes an operator seat 34 for the operator responsible for drive control of the automatic driving vehicle 10, control of respective instruments (for example, an air conditioner or a wiper) of the automatic driving vehicle 10, and an operation for opening/closing the automatic door 18 and extending/retracting the automatic ramp 20. In FIG. 3, a seat portion 34a of the operator seat 34 is flipped down such that a seat bottom 34b is seen. The seat portion 34a can be flipped up. An operator controls the automatic driving vehicle 10, while sitting on the operator seat 34 or standing near the operator seat 34. In this embodiment, the operator seat 34 is provided in the left end area in the cabin; that is, along the side surface with the automatic door 18 and the automatic ramp 20, and near the front end area. Alternatively, the operator seat 34 can be provided near the right front end area in the cabin.

In an end area in the vehicle width direction forward of the operator seat 34 in the cabin, there is provided an armrest 36 for the operator sitting on the operator seat 34 to place his/her arm. The armrest 36 extends in the front-rear direction. As the operator seat 34 is provided in the left end area in the cabin in this embodiment, as described above, the armrest 36 as well is disposed in the left end area in the cabin. If the operator seat 34 is provided in the right end area in the cabin, the armrest 36 as well is disposed in the right end area in the cabin. The armrest 36 is provided at a position higher than the seat bottom 34b of the operator seat 34 while in a condition that allows an operator to sit thereon.

The armrest 36 includes a mechanical operation unit (not illustrated) for inputting a drive control instruction in relation to the automatic driving vehicle 10. The mechanical operation unit can be stored in a storage unit (not illustrated) provided to the armrest 36. In this embodiment, the mechanical operation unit has a stick shape extending in the up-down direction and capable of inclining in the front-rear and right-left directions with its lower end portion as a fulcrum. Inclining the mechanical operation unit either forward or rearward can accelerate or decelerate the automatic driving vehicle 10, while inclining the mechanical operation unit either rightward or leftward can turn the automatic driving vehicle 10 right or left. The mechanical operation unit may be operable in any driving mode of the automatic driving vehicle 10, and is used mainly in the manual driving mode. The automatic driving vehicle 10 does not include a foot pedal, such as an acceleration pedal or a brake pedal, like those provided in conventional automobiles, to be operated with a foot to input a vehicle speed control instruction.

A touch panel 38 is disposed on the front end portion of the armrest 36 so as to stand upward from the upper surface of the armrest 36 (refer to FIG. 4). The touch panel 38 is disposed with its display surface (an operation surface) directed rearward (toward the operator seat 34). Thus, the operator can operate the touch panel 38 with his/her finger while sitting on the operator seat 34 and resting his/her arm on the armrest 36.

The touch panel 38 displays various buttons, so that an operator can input a drive control instruction in relation to the automatic driving vehicle 10, using the buttons displayed on the touch panel 38. In this embodiment, in particular, a vehicle speed control instruction among drive control instructions can be inputted via the touch panel 38. In addition to the drive control instruction, an instrument control instruction in relation to an instrument (for example, a blinker, a horn, a headlight, an air conditioner, or a wiper) of the automatic driving vehicle 10 can be inputted, using the touch panel 38 in this embodiment.

A display 40 that displays information on the automatic driving vehicle 10 is provided at the front left corner in the cabin. The display 40 displays, for example, information such as the vehicle speed, outside temperature, and the next bus stop of the automatic driving vehicle 10. Similar to the touch panel 38, the display 40 is disposed with its display surface directed rearward. Accordingly, the touch panel 38 and the display 40 appear aligned toward the operator sitting on the operator seat 34.

Figure 5:
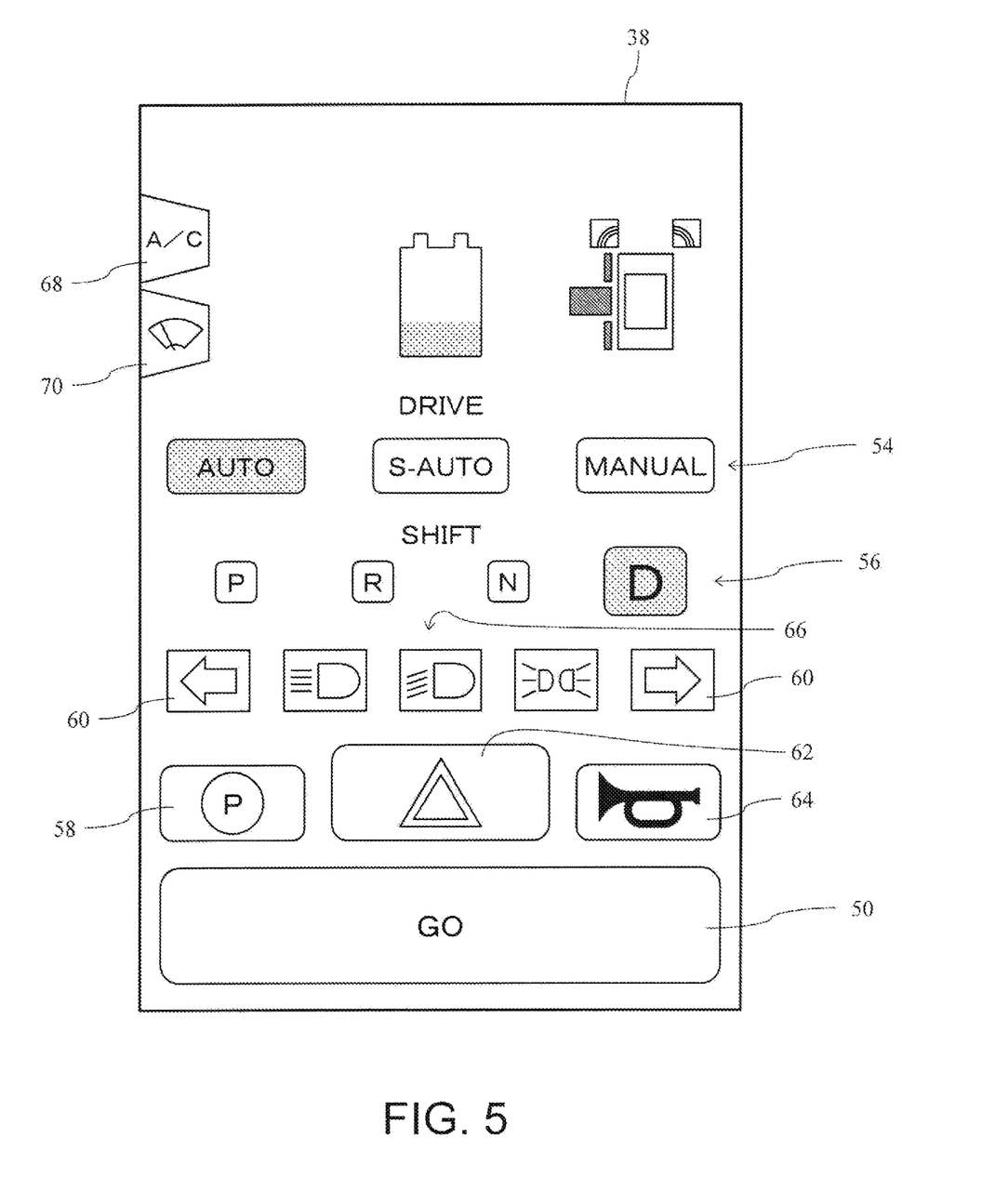
FIG. 5 illustrates a touch panel screen with the vehicle stopped.
Figure 6:
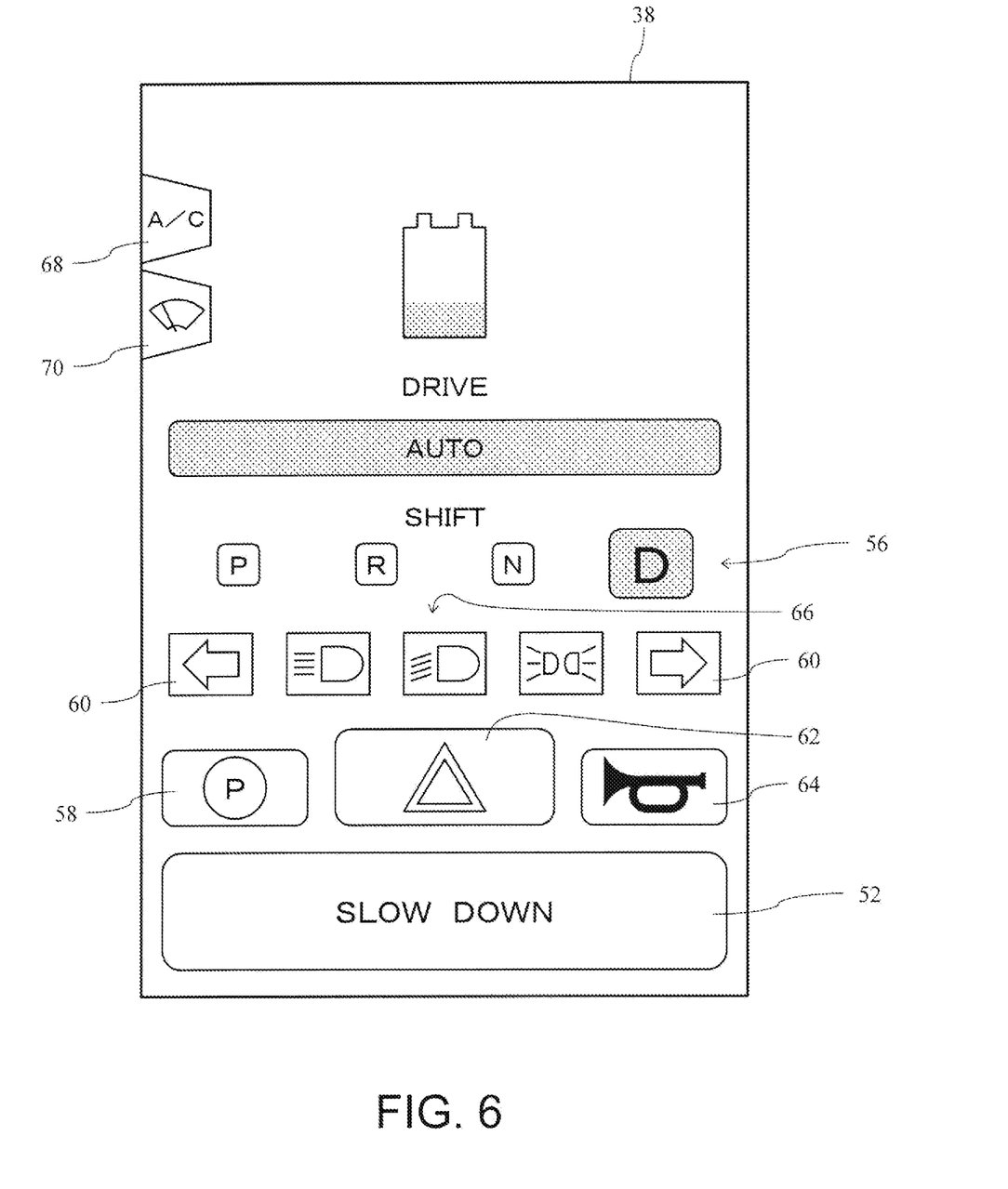
FIG. 6 illustrates a touch panel screen with the vehicle in automatic running.

FIG. 5 and FIG. 6 illustrate a screen displayed on the touch panel 38. FIG. 5 illustrates a display screen displayed with the automatic driving vehicle 10 stopped in the automatic driving mode. FIG. 6 illustrates a display screen displayed with the automatic driving vehicle 10 running in the automatic driving mode.

As illustrated in FIG. 5, a GO button 50 is displayed on the touch panel 38 when the automatic driving vehicle 10 is stopped in the automatic driving mode. The GO button 50 is a button for inputting a launch instruction in relation to the automatic driving vehicle 10. That is, with the GO button 50 operated, the automatic driving vehicle 10 begins running (in the automatic driving mode in this case).

As illustrated in FIG. 6, a SLOW DOWN button 52 is displayed on the touch panel 38, instead of the GO button 50, when the automatic driving vehicle 10 is running in the automatic driving mode. The SLOW DOWN button 52 is a button for inputting a deceleration control instruction in relation to the automatic driving vehicle 10. That is, with the SLOW DOWN button 52 operated, the automatic driving vehicle 10 decelerates. Repetitive operations of the SLOW DOWN button 52 may be able to stop the automatic driving vehicle 10.

In this embodiment, an operator is allowed to input only a deceleration control instruction as a vehicle speed control instruction while the automatic driving vehicle 10 is in the automatic driving mode and running. Alternatively, a button for inputting an acceleration control instruction or a button for inputting a stop instruction may be displayed, in addition to the SLOW DOWN button 52, so that the operator can input an acceleration control instruction or a stop instruction. Needless to say, in the automatic driving mode, the automatic driving vehicle 10 can automatically decelerate or stop in response to an instruction from the management center. When the automatic driving vehicle 10 stops running, the GO button 50 appears again, instead of the SLOW DOWN button 52, as illustrated in FIG. 5.

In addition to the button for vehicle speed control, the touch panel 38 displays a driving mode button 54 for inputting a driving mode change instruction, a shift button 56 for inputting a gear shift control instruction, a P brake button 58 for inputting activation/release instruction in relation to an automatic parking brake, and various instrument control buttons for inputting instrument control instructions in relation to the instruments of the automatic driving vehicle 10. In the example illustrated in FIG. 5 and FIG. 6, a blinker button 60 for controlling a blinker, a hazard button 62 for causing a hazard indicator to operate, a horn button 64 for causing a horn to operate, a light button 66 for controlling a headlight and a taillight, an air conditioner tab 68 for controlling an air conditioner, and a wiper tab 70 for controlling a wiper are displayed as the instrument control buttons. With the air conditioner tab 68 touched, various buttons for controlling the air conditioner appear. With the wiper tab 70 touched, various buttons for controlling the wiper appear. The driving mode button 54 is operable only while the automatic driving vehicle 10 is stopped. In the automatic driving mode, the shift button 56 is not operable, as the operator is not allowed to shift gears in this embodiment.

The touch panel 38 does not display either a button for opening/closing the automatic door 18 or a button for extending/retracting the automatic ramp 20. That is, an opening/closing instruction for the automatic door 18 and an extension/retraction instruction for the automatic ramp 20 cannot be inputted via the touch panel 38. Note that a button for opening/closing the automatic door 18 and a button for extending/retracting the automatic ramp 20 may be displayed on the touch panel 38 in combination only in the event of failure of a door switch 80 or a ramp switch 82, to be described later, or in the event of an emergency.

Figure 7:
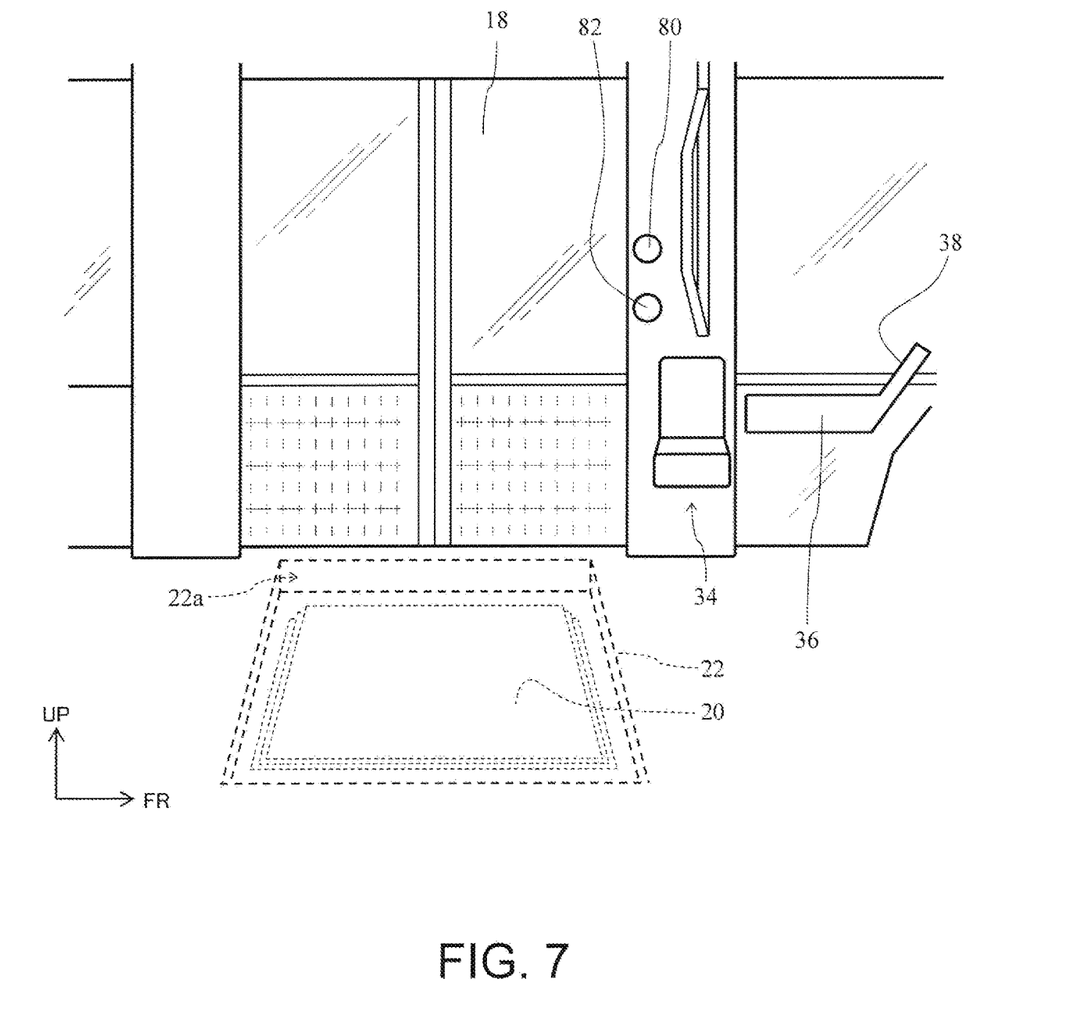
FIG. 7 illustrates a door switch and a ramp switch.

FIG. 7 illustrates an area near the automatic door 18 in the cabin. In FIG. 7, the storage unit 22 below the floor, the opening 22a of the storage unit 22, and the automatic ramp 20 stored in the storage unit 22 are illustrated with a broken line. In this embodiment, separately from the touch panel 38, the door switch 80 for opening and closing the automatic door 18 and the ramp switch 82 for extending and retracting the automatic ramp are provided at positions spaced apart from the touch panel 38. Specifically, in this embodiment, the touch panel 38 is provided on the front end portion of the armrest 36 positioned forward of the operator seat 34, while the door switch 80 and the ramp switch 82 are provided near the automatic door 18 and above and behind the operator seat 34, as to be described later in detail. In particular, the door switch 80 and the ramp switch 82 may be provided close to each other on a wall surface in the cabin.

When the operator operates the door switch 80 with the automatic door 18 closed, the automatic door 18 is opened. When the operator operates the door switch 80 with the automatic door 18 open, the automatic door 18 is closed. Alternatively, an open switch for opening the automatic door 18 and a close switch for closing the automatic door 18 may be separately provided as the door switch 80.

When the operator operates the ramp switch 82 with the automatic ramp 20 stored in the storage unit 22, the automatic ramp 20 projects leftward from the opening 22a. When the operator operates the ramp switch 82 with the automatic ramp 20 projecting, the automatic ramp 20 is retracted to be stored in the storage unit 22. Alternatively, a projecting switch for projecting the automatic ramp 20 and a storage switch for storing the automatic ramp 20 may be separately provided as the ramp switch 82.

Although the door switch 80 and the ramp switch 82 are both mechanical switches in this embodiment, the door switch 80 and the ramp switch 82 may be of any type, other than a mechanical switch, so long as the switches are disposed spaced apart from the touch panel 38. For example, another touch panel may be disposed at the position where the door switch 80 and the ramp switch 82 are illustrated in FIG. 7, to display the door switch 80 and the ramp switch 82 on the display.

Provision of the door switch 80 in addition to the touch panel for inputting a drive control instruction in relation to the automatic driving vehicle 10 at a position spaced apart from the touch panel 38 makes it possible to prevent erroneous operation of the door switch 80 by the operator. Specifically, since the door switch 80 is disposed spaced apart from the touch panel 38, the operator intending to operate the touch panel 38 to input a drive control instruction can be prevented from erroneously operating the door switch 80. In addition, since the touch panel 38 is disposed spaced apart from the door switch 80, the operator intending to operate the door switch 80 to open or close the automatic door 18 can be prevented from erroneously operating the touch panel 38.

Similarly, provision of the ramp switch 82 in addition to the touch panel 38 makes it possible to prevent erroneous operation of the ramp switch 82 by the operator. Specifically, since the ramp switch 82 is disposed spaced apart from the touch panel 38, the operator intending to operate the touch panel 38 to input a drive control instruction can be prevented from erroneously operating the ramp switch 82. In addition, since the touch panel 38 is disposed spaced apart from the ramp switch 82, the operator intending to operate the ramp switch 82 to extend or retract the automatic ramp 20 can be prevented from erroneously operating the touch panel 38.

In order to encourage the operator to check whether the area near the automatic door 18 is in a safe condition (for example, whether no passenger is present near the automatic door 18) when the operator operates the door switch 80, the door switch 80 may be disposed near the automatic door 18. As illustrated in FIG. 7, in this embodiment the door switch 80 is disposed near the automatic door 18 and above and further rearward than the operator seat 34. Thus, in this embodiment the operator stands up from the operator seat 34 to operate the door switch 80. With the door switch 80 disposed near the automatic door 18, the operator always moves closer to the automatic door 18 when operating the door switch 80. That is, it is possible to encourage the operator to check the condition near the automatic door 18 when the operator operates the door switch 80.

Alternatively, the door switch 80 may be disposed in the direction toward the automatic door 18 when viewed from the operator seat 34. Disposition of the door switch 80 in the direction toward the automatic door 18 when viewed from the operator seat 34 makes the operator sitting on the operator seat 34 naturally see the side of the automatic door 18 when the operator operates the door switch 80. Thus, it is possible to encourage the operator to check the condition near the automatic door 18 when the operator operates the door switch 80. Alternatively, the door switch 80 may be disposed at a position that is closer to the automatic door 18 than is the touch panel 38.

In particular, in the case where the touch panel 38 is disposed forward of the operator seat 34 and the automatic door 18 is disposed behind the operator seat 34, the operator sitting on the operator seat 34 usually faces the side of the touch panel 38 (that is, forward), but not the side of the automatic door 18 (that is, rearward). In such a case, disposition of the door switch 80 near the automatic door 18 or in the direction toward the automatic door 18 when viewed from the operator seat 34, or disposition of the door switch 80 at a position that is closer to the automatic door 18 than is the touch panel 38 is particularly effective in encouraging the operator to check the condition near the automatic door 18 when the operator operates the door switch 80.

Alternatively, the door switch 80 may be disposed at a position that is closer to the operator seat 34 than is the automatic door 18 and to the side of the operator seat 34. This disposition as well can encourage the operator to check the condition near the automatic door 18 when the operator operates the door switch 80, as described above.

Similarly, in order to encourage the operator to check whether an area near the opening 22a of the storage unit 22, through which the automatic ramp 20 projects, is in a safe condition (for example, whether no passenger is present near the opening 22a) when the operator operates the ramp switch 82, the ramp switch 82 may be disposed near the opening 22a. As illustrated in FIG. 7, in this embodiment the ramp switch 82 is disposed near the opening 22a and above and further rearward than the operator seat 34. As the opening 22a, through which the automatic ramp 20 projects, is generally provided below the automatic door 18, disposition of the ramp switch 82 near the opening 22a results in the ramp switch 82 being disposed near the automatic door 18. Although the door switch 80 and the ramp switch 82 are closely positioned to each other in this embodiment, these may be positioned spaced apart from each other. In particular, in this embodiment, as the operator stands up from the operator seat 34 to operate the ramp switch 82, disposition of the ramp switch 82 near the opening 22a always encourages the operator to move closer to the opening 22a when the operator operates the ramp switch 82. This can encourage the operator to check the condition near the opening 22a when the operator operates the ramp switch 82.

Alternatively, the ramp switch 82 may be disposed in the direction of the opening 22a when viewed from the operator seat 34. Disposition of the ramp switch 82 in the direction of the opening 22a when viewed from the operator seat 34 makes the operator sitting on the operator seat 34 naturally see the side of the opening 22a when the operator operates the ramp switch 82. This can encourage the operator to check the condition near the opening 22a when the operator operates the ramp switch 82. Alternatively, the ramp switch 82 may be disposed at a position that is closer to the automatic ramp 20 than is the touch panel 38.

In particular, in the case where the touch panel 38 is disposed forward of the operator seat 34 and the opening 22a is disposed behind the operator seat 34, the operator sitting on the operator seat 34 usually faces the side of the touch panel 38 (that is, forward), but not the side of the opening 22a (that is, rearward). In such a case, disposition of the ramp switch 82 near the opening 22a or in the direction of the opening 22a when viewed from the operator seat 34 or disposition of the ramp switch 82 at a position that is closer to the automatic ramp 20 than is the touch panel 38 is particularly effective in encouraging the operator to check the condition near the opening 22a when the operator operates the ramp switch 82.

Alternatively, the ramp switch 82 may be disposed closer to the operator seat 34 than is the automatic ramp 20 and to the side of the operator seat 34. This disposition as well can encourage the operator to check the condition near the automatic ramp 20 when the operator operates the ramp switch 82, as described above.

An embodiment of an operation device of an automatic driving vehicle according to this disclosure has been described. The display device of an automatic driving vehicle according to this disclosure is not limited to the above-described embodiment, and can be modified in various manners without departing from the gist of the present disclosure.

The invention claimed is:

1. An operation device of an automatic driving vehicle of bus type, the automatic driving vehicle being capable of automatic driving and to be ridden by many unspecified occupants, the operation device comprising:
   a touch panel for enabling input of a drive control instruction and input of a control instruction in relation to a vehicle-mounted instrument, and for displaying a button for inputting the drive control instruction in relation to the automatic driving vehicle;
   a door switch disposed at a position spaced apart from the touch panel, the door switch being for opening and closing an automatic door; and
   an operator seat for an operator who operates the touch panel and the door switch, the operator seat being disposed between the touch panel and the door switch in a longitudinal direction of the automatic driving vehicle.

2. The operation device of an automatic driving vehicle according to claim 1, wherein
   the door switch is disposed between the automatic door and the operator seat.

3. The operation device of an automatic driving vehicle according to claim 1, wherein
   the automatic door is provided only on one side surface of the automatic driving vehicle,
   the operator seat is provided behind the touch panel, and
   the door switch is provided at a position that is closer to the automatic door than is the touch panel.

4. The operation device of an automatic driving vehicle according to claim 1, wherein the operator seat is provided behind the touch panel,
   the operator seat is disposed along a wall surface on a side with the automatic door, and
   the door switch is disposed closer to the operator seat than is the automatic door and to a side of the operator seat.

5. The operation device of an automatic driving vehicle according to claim 1, wherein the door switch is not displayed on the touch panel.

6. The operation device of an automatic driving vehicle according to claim 1, further comprising a ramp switch for extending and retracting an automatic ramp that is stored in a storage unit provided below a floor of the automatic driving vehicle, the automatic ramp being projectable to a lateral side of the automatic driving device through an opening of the storage unit, wherein
   the door switch and the ramp switch are provided adjacent each other on a wall surface in a cabin of the automatic driving vehicle.

7. An operation device of an automatic driving vehicle of bus type, the automatic driving vehicle being capable of automatic driving and to be ridden by many unspecified occupants, the operation device comprising:
   a touch panel for enabling input of a drive control instruction and input of a control instruction in relation to a vehicle-mounted instrument, and for displaying a button for inputting the drive control instruction in relation to the automatic driving vehicle;
   a ramp switch for extending and retracting an automatic ramp that is stored in a storage unit provided below a floor of the automatic driving vehicle, the automatic ramp being projectable to a lateral side of the automatic driving device through an opening of the storage unit, the ramp switch being provided at a position spaced apart from the touch panel; and
   an operator seat for an operator who operates the touch panel and the ramp switch, the operator seat being disposed between the touch panel and the ramp switch in a longitudinal direction of the automatic driving vehicle.

8. The operation device of an automatic driving vehicle according to claim 7, wherein
   the ramp switch is disposed between the opening of the storage unit and the operator seat.

9. The operation device of an automatic driving vehicle according to claim 7, wherein
   the automatic ramp is provided only on one side surface of the automatic driving vehicle,
   the operator seat is provided behind the touch panel, and
   the ramp switch is provided at a position that is closer to the automatic ramp than is the touch panel.

10. The operation device of an automatic driving vehicle according to claim 7, wherein the operator seat is provided behind the touch panel, wherein
    the operator seat is disposed along a wall surface on a side with the automatic ramp, and
    the ramp switch is disposed closer to the operator seat than is the automatic ramp and to a side of the operator seat.

11. The operation device of an automatic driving vehicle according to claim 7, wherein the ramp switch is not displayed on the touch panel.

12. The operation device of an automatic driving vehicle according to claim 7, further comprising a door switch for opening and closing an automatic door, wherein
    the ramp switch and the door switch are provided adjacent each other on a wall surface in a cabin of the automatic driving vehicle.

* * * * *